US012800806B2

(12) United States Patent
Otani et al.

(10) Patent No.: US 12,800,806 B2
(45) Date of Patent: Nov. 17, 2026

(54) OPTICAL MEMBER AND OPTICAL DEVICE

(71) Applicant: FUJIFILM Corporation, Tokyo (JP)

(72) Inventors: Taketo Otani, Kanagawa (JP); Yukito Saitoh, Kanagawa (JP); Hideki Yasuda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 190 days.

(21) Appl. No.: 18/824,541

(22) Filed: Sep. 4, 2024

(65) Prior Publication Data

US 2024/0427115 A1 Dec. 26, 2024

Related U.S. Application Data

(63) Continuation of application No. PCT/JP2023/013500, filed on Mar. 31, 2023.

(30) Foreign Application Priority Data

Mar. 31, 2022 (JP) ................................ 2022-059219

(51) Int. Cl.

*G02B 5/18* (2006.01)
*G02B 3/00* (2006.01)
*G02B 19/00* (2006.01)

(52) U.S. Cl.

CPC ............ *G02B 5/1809* (2013.01); *G02B 3/00* (2013.01); *G02B 19/0047* (2013.01); *G02B 2003/0093* (2013.01)

(58) Field of Classification Search

CPC .... G02B 5/1809; G02B 3/00; G02B 19/0047; G02B 2003/0093; G02B 1/002; G02B 1/02; G02B 5/00; G02B 5/18
See application file for complete search history.

(56) References Cited

U.S. PATENT DOCUMENTS

2016/0320531 A1* 11/2016 Kamali .................. G02B 1/002
2021/0033887 A1 2/2021 Newman
2021/0384638 A1 12/2021 Chan et al.
2022/0082794 A1* 3/2022 Kim ..................... G02B 13/003

FOREIGN PATENT DOCUMENTS

WO 2023/283715 A1 1/2023

OTHER PUBLICATIONS

International Search Report issued in PCT/JP2023/013500 on Jun. 6, 2023.
Written Opinion issued in PCT/JP2023/013500 on Jun. 6, 2023.
International Preliminary Report on Patentability completed by WIPO on Sep. 24, 2024 in connection with International Patent Application No. PCT/JP2023/013500.

* cited by examiner

*Primary Examiner* — Charles S Chang
(74) *Attorney, Agent, or Firm* — Edwards Neils LLC; Jean C. Edwards, Esq.

(57) ABSTRACT

An optical member capable of achieving reduction in size while suppressing a loss of electromagnetic waves by using a metasurface structure, and an optical device including the optical member. The optical member includes a substrate; and a metasurface structure that has a plurality of microstructures arranged to be provided on at least one surface of the substrate, in which at least a part of the optical member has a curved shape.

19 Claims, 7 Drawing Sheets

OPTICAL MEMBER AND OPTICAL DEVICE

CROSS-REFERENCE TO RELATED APPLICATIONS

This application is a Continuation of PCT International Application No. PCT/JP2023/013500 filed on Mar. 31, 2023, which was published under PCT Article 21(2) in Japanese, and which claims priority under 35 U.S.C. § 119(a) to Japanese Patent Application No. 2022-059219 filed on Mar. 31, 2022. The above applications are hereby expressly incorporated by reference, in their entirety, into the present application.

BACKGROUND OF THE INVENTION

1. Field of the Invention

The present invention relates to an optical member using a metasurface structure and an optical device using the optical member.

2. Description of the Related Art

A 5G communication system (fifth generation mobile communication system) and a 6G communication system (sixth generation mobile communication system) that is a next-generation communication standard have been attracting attention.

In order to use such wireless communication in a high-frequency band, it is necessary to reduce the size of an optical member used in a high-frequency communication device.

For example, as the light source, a small light source such as a resonant tunneling diode (RTD) or a quantum cascade laser (QCL) has been studied.

In accordance with such a flow, it is also necessary to reduce the size of an optical member other than the light source, such as a lens.

However, in the wireless communication using high-frequency electromagnetic waves for communication, in the silicon lens and the prism in the related art, it is necessary to use an extremely thick dome-like lens.

As an optical member that is able to solve such a problem, there has been proposed a thin lens (metalens) using a metasurface structure described in Quanlong Yang et al., Efficient flat-plate-shaped metalens for terahertz imaging, Vol. 22, Issue 21, pp. 25931-25939 (2014).

The metasurface structure is formed by arranging microstructures serving as resonators, and is used as an optical member such as a lens by imparting desired phase characteristics to incident electromagnetic waves and emitting the electromagnetic waves.

Such a metasurface structure has a configuration in which the microstructures are arranged on a thin dielectric film as a substrate. Therefore, with the metasurface structure, it is possible to realize a thin optical member even for high-frequency electromagnetic waves.

SUMMARY OF THE INVENTION

Here, depending on the configuration of the communication system, there may be a restriction on a space in which the optical member is disposed. Therefore, it is preferable that the optical member such as a lens has a small area such that the optical member can be provided even in a small space. On the other hand, the optical member is also necessary to reduce the loss of the electromagnetic waves emitted by the light source as much as possible.

However, in the metasurface structure, in order to prevent the loss of the electromagnetic waves emitted by the light source, an area corresponding to a spread angle of the electromagnetic waves emitted by the light source is necessary. In addition, in a case where the area is reduced, the loss of the electromagnetic waves emitted by the light source is increased.

FIG. 9 conceptually shows an optical device that converts electromagnetic waves emitted from a light source 100 into parallel light by using a metalens 102.

As shown on the left side of FIG. 9, in order to convert the electromagnetic waves emitted from the light source 100 into the parallel light without loss through the metalens 102, the metalens 102 having an area corresponding to a focal length f of the metalens 102 and the spread angle of the electromagnetic waves emitted from the light source 100 is necessary.

On the other hand, as shown on the right side of FIG. 9, in a case where the area of the metalens 102 is reduced, the electromagnetic waves passing through the outside of the metalens 102 are lost.

That is, in the optical member using the metasurface structure such as a metalens, the loss of the incident electromagnetic waves occurs in a case where the area is reduced. Conversely, in order to prevent the loss of the electromagnetic waves, an optical member having a certain area is necessary.

In order to solve such a problem of the related art, an object of the present invention is to provide an optical member using a metasurface structure, the optical member capable of achieving reduction in size while suppressing the loss of electromagnetic waves, and an optical device using the optical member.

In order to solve the above-mentioned problem, the present invention has the following configurations.

[1] An optical member according to an aspect of the present invention comprises: a substrate; and a metasurface structure that has a plurality of microstructures arranged to be provided on at least one surface of the substrate, in which at least a part of the optical member has a curved shape.

[2] In the optical member according to [1], the optical member has a function of concentrating electromagnetic waves in a case where the electromagnetic waves are incident from one surface of the substrate, and the curved shape has a concave surface on a light concentration side.

[3] In the optical member according to [1] or [2], the optical member is a transmissive lens or a reflective lens.

[4] In the optical member according to [1], the optical member is a diffractive element.

[5] In the optical member according to any one of [1] to [4], a wavelength targeted by the metasurface structure is 10 μm to 1 cm.

[6] In the optical member according to any one of [1] to [5], the entire surface is a co-directionally concave surface.

[7] The optical member according to any one of [1] to [5], further comprises: a flat surface portion; and a curved surface portion that is positioned outside the flat surface portion and that is co-directionally concave.

[8] An optical device according to an aspect of the present invention comprises: the optical member according to any one of [1] to [7]; and a light source.

[9] In the optical device according to [8], assuming that the optical member has a light concentration function, a focal length of the optical member is f [mm], and a wavelength of electromagnetic waves emitted from the light source is λs [mm], an angle θs, which is formed by a line connecting a center of the optical member to the light source and a line connecting an end part of the optical member to the light source, satisfies a following relationship, $$\theta s > \arccos[f/(f+\lambda s/2)].$$

According to the present invention, it is possible to achieve reduction in size while suppressing the loss of electromagnetic waves in an optical member using a metasurface structure.

DESCRIPTION OF THE PREFERRED EMBODIMENTS

Hereinafter, an optical member and an optical device according to an embodiment of the present invention will be described in detail on the basis of a preferable example shown in the accompanying drawings.

In the present specification, numerical ranges represented by "to" include numerical values before and after "to" as lower limit values and upper limit values.

In the present specification, the meaning of "the same" includes a case where an error range is generally allowable in the technical field.

Further, the drawings to be shown later are conceptual diagrams for describing the embodiment of the present invention. Accordingly, a shape, a size, a positional relationship, and the like of each member do not necessarily match an actual shape, an actual size, an actual positional relationship, and the like.

Figure 1:
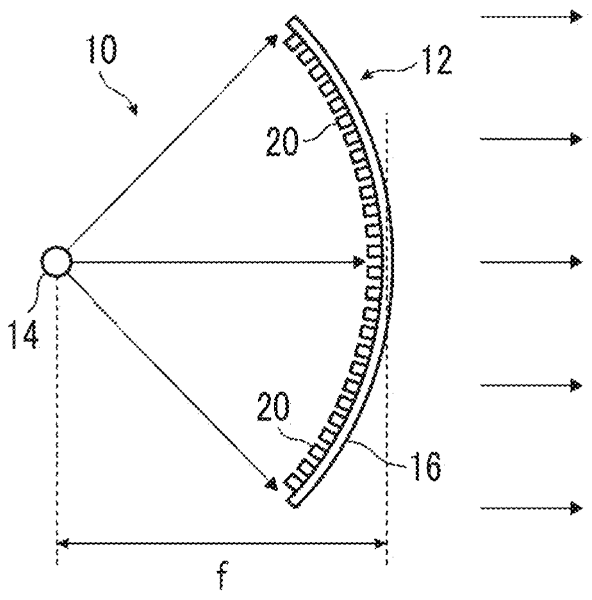
FIG. 1 is a diagram conceptually showing an example of an optical device according to an embodiment of the present invention using an example of an optical member according to the present invention.

FIG. 1 conceptually shows an example of the optical device according to the embodiment of the present invention using an example of the optical member according to the embodiment of the present invention.

An optical device 10 shown in FIG. 1 includes a metalens 12 and a light source 14. The metalens 12 is a metalens (metasurface lens) applied to the optical member according to the embodiment of the present invention and has a substrate 16 and a metasurface structure which is provided on one surface of the substrate 16 and on which a plurality of microstructures 20 are arranged.

Further, at least a part of the metalens 12 applied to the optical member according to the embodiment of the present invention has a curved shape. For example, the metalens 12 according to the example shown in the drawing has a spherically curved shape.

The metalens 12 will be described in detail later.

In the optical device 10 according to the embodiment of the present invention, the light source 14 is not limited, and various well-known light sources can be used as long as the light source 14 emits electromagnetic waves having a wavelength to be targeted by the metalens 12.

In the present invention, the metalens 12 (optical member) preferably targets electromagnetic waves having a wavelength of 10 μm to 1 cm for collimation or the like.

Accordingly, as the light source 14, a light source of which a central wavelength of emitted electromagnetic waves is in a range of 10 μm to 1 cm is preferably used. Examples of such a light source 14 include a resonant tunneling diode (RTD), a quantum cascade laser (QCL), and a graphene laser.

Figure 2:
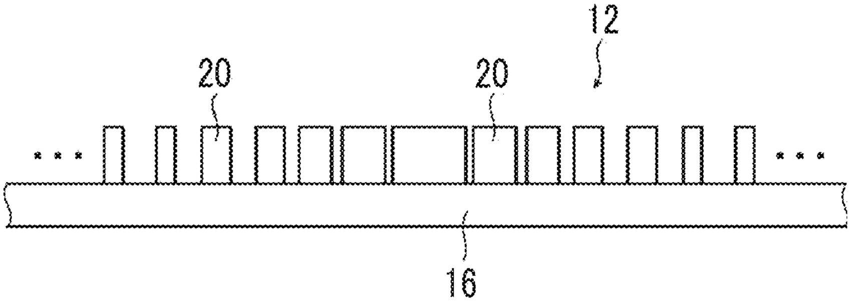
FIG. 2 is a conceptual diagram for describing a configuration of the optical member according to the embodiment of the present invention.

FIG. 2 is a conceptual diagram showing a part of the metalens 12 in an enlarged manner.

As described above, the metalens 12 has the substrate 16 and the metasurface structure which is provided on one surface of the substrate 16 and in which the plurality of microstructures 20 are arranged.

The optical member according to the embodiment of the present invention has at least the part having the curved shape. In the metalens 12 according to the example shown in the drawing, the substrate 16 has a spherically curved shape. Further, in the metalens 12 according to the example shown in the drawing, the microstructures 20 are arranged on the concave surface side.

The metalens 12 according to the example shown in the drawing is a transmissive metalens which concentrates electromagnetic waves and of which a focal point is at the center of a sphere in the spherically curved shape as an example. Accordingly, in the metasurface structure constituting the metalens 12, the microstructures 20, that is, unit cells described below are arranged such that the center of the sphere is a focal point.

That is, as a preferable aspect, the metalens 12 has a curved shape having a concave surface on a side for concentrating the electromagnetic waves. In other words, as a preferable aspect, the metalens 12 is a metalens having a focal point on the concave surface side.

In the optical device 10, the light source 14 is disposed at the focal point of the metalens 12.

The metalens 12 is, for example, a collimating lens that collimates electromagnetic waves, which are diffused waves emitted from the light source 14, into parallel light (collimated light). Accordingly, the metalens 12 concentrates the parallel light incident from the side opposite to the light source 14 (the convex surface side) at the position of the light source 14 that is at the focal point.

In the optical device 10 according to the embodiment of the present invention, the wavelength of the electromagnetic waves to be concentrated and collimated by the metalens 12 (metasurface structure) are not limited, and electromagnetic waves having various wavelengths can be used.

Among the electromagnetic waves, electromagnetic waves having a wavelength of 10 μm to 1 cm (0.01 to 10 mm) are suitably used. That is, it is preferable that the metalens 12 targets electromagnetic waves (millimeter waves to terahertz waves) having a frequency of 0.03 THz (30 GHz) to 30 THz.

In the metalens 12 according to the embodiment of the present invention, the substrate 16 is not limited. Various known sheet-like materials (a film, a plate-like material, and a layer) can be used as long as the substrate 16 is capable of supporting the microstructures 20 and transmitting the electromagnetic waves having the wavelength to be targeted by the metalens 12.

As described above, the metalens 12 suitably corresponds to the electromagnetic waves having the wavelength of 10 μm to 1 cm. Accordingly, the substrate 16 is suitably formed of a sheet-like material made of a material having a high transmittance for the electromagnetic waves having the wavelength of 10 μm to 1 cm. Examples of the material for forming the substrate 16 include a cycloolefin polymer (COP), a polyimide resin, a fluororesin such as polytetrafluoroethylene (PTFE), a liquid crystal polymer, a composite material of a polymer and ceramics, glass, silicon, and the like.

Among the materials, the substrate 16 made of COP having a high transmittance for the electromagnetic waves in the above-mentioned wavelength range is preferably used.

A thickness of the substrate 16 is not limited, and a thickness capable of supporting the microstructures 20 and ensuring a sufficient transmittance for the electromagnetic waves targeted by the metalens 12 may be appropriately set in accordance with the material for forming the substrate 16.

The metalens 12 is formed by arranging a plurality of microstructures 20 and diffracts and concentrates electromagnetic waves. In other words, a refractive index of the metalens 12, that is, a rate of change in phase imparted to the transmitted electromagnetic waves gradually changes from the center toward the outside.

Basically, the metalens 12 according to the embodiment of the present invention is the same as a known metalens, that is, a condenser lens using the metasurface structure, except that the metalens 12 has a curved shape. The metalens 12 concentrates the electromagnetic waves by refracting (diffracting) the transmitted electromagnetic waves through phase modulation.

Accordingly, the metalens 12 is formed by two-dimensionally arranging the microstructures 20 that act as resonators on the substrate 16 at a distance from one another. The metalens 12 is basically constituted by an array of unit cells each formed by one microstructure 20 and a space around the microstructure 20. Similarly to the well-known metalens, the metalens 12 modulates a phase of the transmitted light through arrangement of unit cells by using the resonance of the microstructures 20 and refracts the light in accordance with the principle of Huygens' principle through phase modulation, thereby concentrating the light.

In the following description, the microstructures 20 are also referred to as resonators 20.

As described above, the metalens 12 is basically a metalens using a known metasurface structure (metamaterial). Accordingly, a shape and a material for formation of the resonators 20, the arrangement of the resonators 20, the distance (pitch) between the resonators 20, and the like are not limited.

That is, the metalens 12 (metasurface structure) may be designed by a known method according to the desired light concentration characteristics (optical characteristics).

It should be noted that at least a part of the metalens 12 according to the embodiment of the present invention has a curved shape. However, the metalens 12 (optical member) may be designed in the same manner as a typical flat metasurface lens (metasurface structure) in principle.

Here, it is necessary to design the metalens in consideration of an optical path difference caused by changing the shape from the flat plate shape to the curved shape.

As the metalens 12, for example, a structure in which the unit cells are arranged is adopted such that the phase distribution of the transmitted waves satisfies the following expression.

$$\varphi(r)=2\pi/\lambda\times[(r^2+F^2)^{(1/2}-F]+\varphi_0$$

It should be noted that in the expression, λ is a wavelength of the incident electromagnetic waves, r is a distance from the center of the lens, F is a designed focal position, and $\varphi_0$ is a transmission phase of the lens center.

Examples of the structure that can be used in the metalens 12 include a metal pattern structure described in Optics Express, Vol. 29, No. 12, 7 Jun. 2021, pp. 18988, and the dielectric pattern structure described in Optics Express, Vol. 26, No. 23, 12 Nov. 2018, pp. 29817.

Further, an amplitude and a phase of the waves transmitted through the resonators 20 to be used may be calculated using commercially available simulation software, and the arrangement of the resonators 20 may be set so as to obtain a desired distribution of the amounts of phase modulation (refraction).

It should be noted that in the metalens according to the embodiment of the present invention, the number of the resonators 20 included in one unit cell is basically one, but the present invention is not limited thereto. That is, in the metalens according to the embodiment of the present invention, one unit cell may have a plurality of the resonators 20 as necessary, depending on the desired optical characteristics, the sizes and shapes of the resonators 20, the material and shape of the formation, the size of the unit cell, and the like.

However, in a case where one unit cell includes the plurality of the resonators 20, the amounts of phase modulation of the resonators in the space where the resonators are present are basically the same.

As described above, in the metalens 12 according to the embodiment of the present invention, the material for forming the resonators 20 constituting the metalens 12 is not limited, and various materials that have been used as the resonators (microstructures) in the known metalens (metasurface structure) can be used.

Examples of the material for forming the resonators 20 include a metal and a dielectric substance. In a case of a metal, copper, gold, and silver are preferably exemplified from the viewpoint of low optical loss. On the other hand, in a case of a dielectric substance, silicon, titanium oxide, and germanium are preferably exemplified from the viewpoint that the refractive index is large and a large phase modulation is possible.

Similarly, the shape of the resonator 20 constituting the metalens 12 is not limited, and various shapes that are used as resonators in the known metalens (metasurface structure) can be used.

For example, examples of the shape of the resonator include: a plate shape (rectangular parallelepiped shape) as shown in FIGS. 1 and 2, a metal wire (metal thread) as described in Quanlong Yang et al., Efficient flat metasurface lens for terahertz imaging, Vol. 22, Issue 21, pp. 25931-25939 (2014), a cylindrical shape, a three-dimensional structure having a V-like bottom surface like end parts of the rectangular parallelepipeds connected to each other as shown in JP2018-46395A, a three-dimensional structure having a cross-like bottom surface like crossed rectangular parallelepipeds, a three-dimensional structure having a substantially H-like bottom surface such as H steel, a three-dimensional structure having a substantially C-like bottom surface such as a C channel, and the like.

Further, as shown in JP2018-46395A, various shapes in which an angle formed by two rectangular parallelepipeds is adjusted can be used for a three-dimensional structure having a V-like bottom surface and a three-dimensional structure having a cross-like bottom surface.

Figure 5:
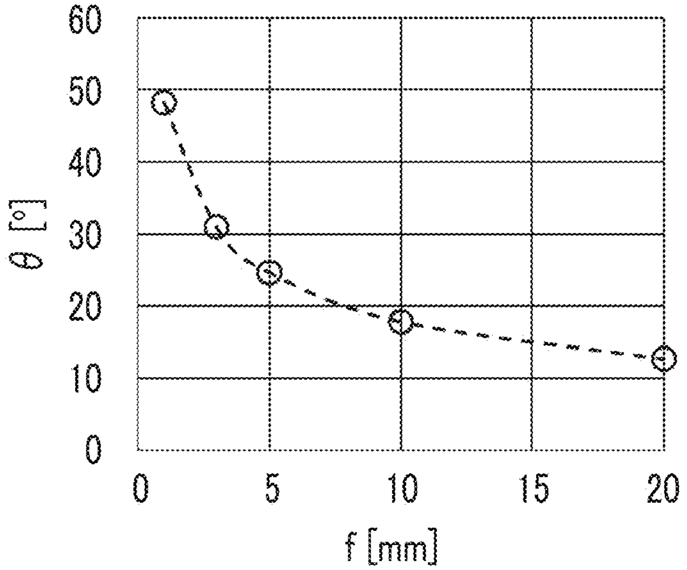
FIG. 5 is a graph showing an example of a relationship between a prospective angle and a focal length in the optical member in the related art.

In addition to the three-dimensional structures, a three-dimensional structure having a bottom surface shape as shown in FIG. 5 of "Appl. Sci. 2018, 8(9), 1689; https://doi.org/10.3390/app8091689" can also be used.

In the metalens 12, only one of the resonators 20 having these shapes may be used, or a plurality of the resonators 20 may be used in combination.

Further, the orientations of the same resonators 20 may be the same as or different from one another as shown in FIG. 1, or orientations of the same direction and orientations of different directions may be mixed.

The metasurface structure of the metalens 12 according to the example shown in the drawing has the resonators 20 arranged on the concave surface side of the substrate 16, but the present invention is not limited thereto. For example, the metalens applied to the optical member according to the embodiment of the present invention may have a metasurface structure on a convex surface side and may have a focal point on a concave surface side. That is, the optical member according to the embodiment of the present invention may have a metasurface structure on the convex surface side and may have a curved shape of which a concave surface is provided on the light concentration side.

Further, in the metalens 12, the metasurface structure in which the resonators 20 are arranged as described above is not limited to one layer, and may be two layers or three or more layers.

Furthermore, the metalens 12 may have a metasurface structure in which the resonators 20 are arranged on both surfaces of the substrate 16.

The optical member according to the embodiment of the present invention has a metasurface structure, and at least a part thereof has a curved shape. As described above, the metalens 12 according to the example shown in the drawing has a spherically curved shape.

The present invention has the above-mentioned configuration, and thus, in an optical member using a metasurface structure, it is possible to achieve reduction in size while suppressing a loss of electromagnetic waves.

Hereinafter, the details will be described with reference to a conceptual diagram of FIG. 3.

As described above, the metalens 12 has a spherically curved shape, the center of the sphere is a focal point, and the light source 14 is disposed at the focal point. Accordingly, the focal length is "f" as shown in FIG. 3.

Further, an angle θ, which is formed by a line connecting the focal point and the center of the metalens 12 and a line connecting the focal point and the end part (outermost peripheral portion) of the metalens 12, is set as the prospective angle θ.

Figure 3:
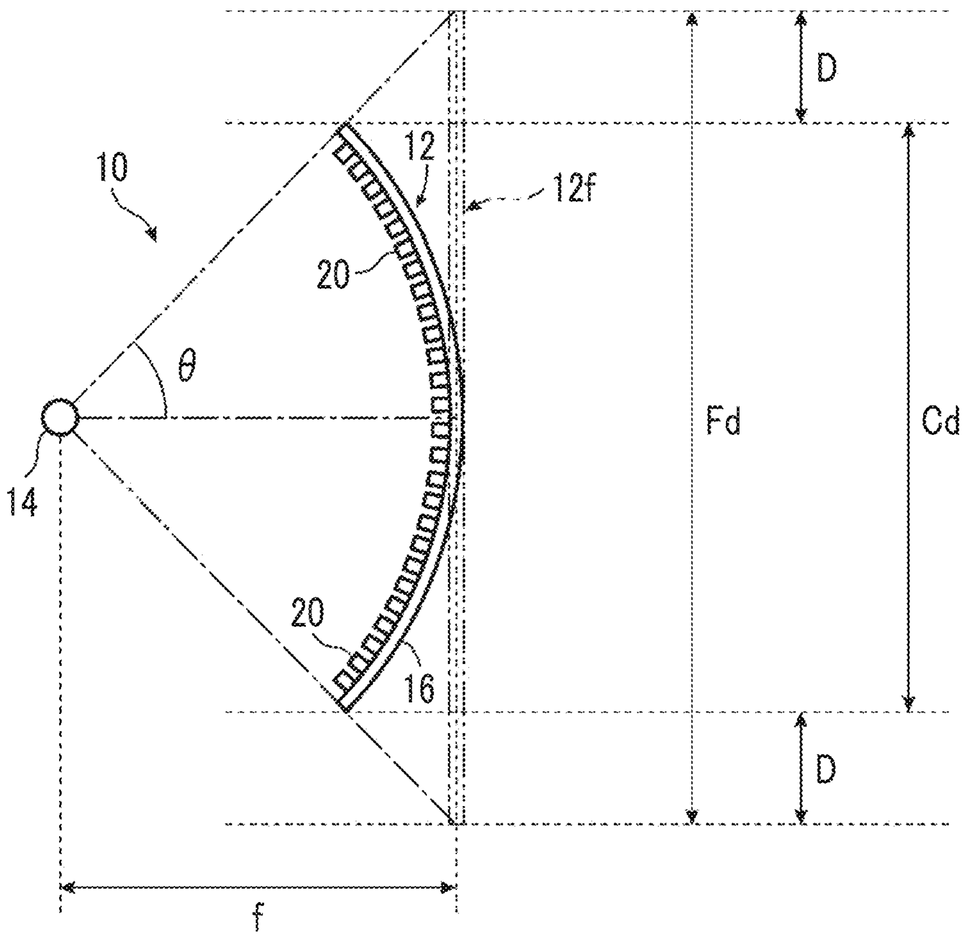
FIG. 3 is a conceptual diagram for describing an action of the optical member according to the embodiment of the present invention.

In FIG. 3, it is assumed that the prospective angle θ and the spread angle of the electromagnetic waves emitted by the light source 14 are equal to each other in order to simplify the description.

In such a case, in order to cause the electromagnetic waves emitted from the light source 14 to be incident on the normal flat-plate-shaped metalens 12F (two-dot chain line) having the same focal length f without loss and to be converted into parallel light, a circular metalens having a diameter Fd is necessary as shown in FIG. 3.

On the other hand, as described above, the metalens 12 according to the embodiment of the present invention has a spherically curved shape. Accordingly, the projection image from the optical axis direction is circular.

According to the spherical metalens 12, as shown in FIG. 3, the electromagnetic waves emitted from the light source 14 can be incident on the circular metalens 12 having a projection shape of a diameter Cd smaller than the diameter Fd to be parallel light without loss.

As shown in FIG. 3, in a case where the diameter of the flat-plate-shaped metalens 12F is Cd, the electromagnetic waves, which are incident into a region corresponding to a difference D between the diameter Fd and the diameter Cd, are lost.

As described above, by using the metalens 12 according to the embodiment of the present invention having the curved shape, it is possible to reduce the size of the metalens without losing the electromagnetic waves emitted from the light source 14 or by significantly suppressing the loss. In other words, by using the metalens 12 having a curved shape according to the embodiment of the present invention, even in a case of reduction in size, the prospective angle θ can be set to the same angle as that of the flat-plate-shaped metalens 12F. As a result, the loss of the electromagnetic waves can be prevented.

That is, according to the present invention, in the metalens 12, in a case where the prospective angle θ is the same, the size (the projection area) of the lens can be reduced as compared with a typical flat-plate-shaped metalens. In a case where the size (the projection area) of the lens is the same, the prospective angle θ can be increased as compared with a typical flat-plate-shaped metalens. Accordingly, by using the metalens 12 according to the embodiment of the present invention having a curved shape, it is possible to achieve both the size reduction and the increase in prospective angle θ, which are not possible with the flat-plate-shaped metalens.

In order to propagate the electromagnetic waves emitted from the light source 14 without loss, it is necessary to increase the prospective angle θ of the lens. That is, in order to propagate the electromagnetic waves emitted from the light source 14 without loss, it is necessary to increase a numerical aperture obtained by "sin θ".

For example, electromagnetic waves in a high-frequency band such as terahertz waves used in a 6G communication system are greatly attenuated in the atmosphere. Therefore, it is preferable to suppress loss in the lens as much as possible. For that purpose, it is preferable to increase the numerical aperture of the lens with respect to the spread angle of the electromagnetic waves emitted from the light source.

On the other hand, in the metalens, the controllable phase range is limited depending on the material for forming the resonators, and the prospective angle θ, that is, the numerical aperture is also limited.

On the other hand, by using the metalens 12 according to the embodiment of the present invention having a curved shape, the prospective angle θ can also be increased as compared with the flat-plate-shaped metalens. That is, by using the metalens 12 according to the embodiment of the present invention having a curved shape, the numerical aperture can be increased as compared with the flat-plate-shaped metalens.

First, the description will be made of the flat-plate-shaped metalens 12F with reference to the conceptual diagram of FIG. 4. The metalens 12F has a circular shape with a radius r.

In order for the flat-plate-shaped metalens 12F to act as a lens (collimating lens), it is necessary to make the phases, that is, the optical path lengths of the electromagnetic waves, which are emitted from the center of the lens indicated by a path A and the electromagnetic waves emitted from the end part of the lens indicated by a path B, equal to each other.

That is, it is necessary for the metalens 12F to provide a phase difference in the metalens by a distance difference (b−f) between the focal length f, which is the distance of the path A from the focal point to the lens center, and a distance b of the path B from the focal point to the end part of the lens.

In the following description of the expression, the metalens 12F is also simply referred to as a "lens". In this regard, the same applies to the metalens 12 having the curved shape, which will be described later.

Accordingly, it is necessary for the metalens 12F to satisfy $(n_0\times f)+(\varphi_1\times\lambda\times\lambda/2\pi)=(n_0\times b)+(\varphi_i\times\lambda/2\pi)$.

$$\text{Accordingly, } n_0\times(b-f)=(\varphi_1-\varphi_i)\times\lambda/2\pi \quad \text{Expression (1-a).}$$

In the above expression, $n_0$ is a refractive index of a space between the focal point and the lens, $\varphi_1$ is a phase difference created by a lens at a lens center (path A), $\varphi_i$ is a phase difference created by a lens at an end part of the lens (path B), f is a focal length, that is, a distance of the path A, b is a distance of the path B, and λ is a wavelength of electromagnetic waves to be targeted by the lens.

Here, the space between the focal point and the lens is air. Accordingly, $n_0=1.0$.

Further, the angle formed by the path A and the path B, that is, the prospective angle θ is "b=f/cos θ". Thus, Expression (1-b) is as follows.

$$1\times(f/\cos\theta-f)=(\varphi_1-\varphi_i)\times\lambda/2\pi \quad \text{Expression (1-b)}$$

The phase difference can be controlled by the lens is represented by $\Delta\varphi=\varphi_1-\varphi_i=\pi$.

In such a case, Expression (1-b) is $f/\cos\theta-f=\lambda/2$, and $$\cos\theta=f/(f+\lambda/2) \quad \text{Expression (2).}$$

The prospective angle θ can be calculated in accordance with the focal length f and the wavelength λ of the electromagnetic waves to be targeted by using Expression (2).

FIG. 5 shows a relationship between the focal length f [mm] and the prospective angle θ [°] calculated from Expression (2).

It should be noted that, in the example, the prospective angle θ is set under the following assumption. It is assumed that a phase range, which the metalens is able to adjust, is 180°, and electromagnetic waves having a frequency of 300 GHz, that is, electromagnetic waves having a wavelength λ=1 mm is assumed.

Next, the metalens 12 having a spherically curved shape will be described with reference to a conceptual diagram of FIG. 6.

Similarly to the above-mentioned flat-plate-shaped metalens 12F, in order for the metalens 12 to act as a lens (collimating lens), it is necessary to make the phase, that is, the optical path length of the electromagnetic waves emitted from the center of the lens indicated by the path A equal to the phase, that is, the optical path length of the electromagnetic waves emitted from the end part of the lens indicated by the path C.

That is, it is necessary to provide a phase difference in the metalens 12 by the distance difference (c−f) between the distance c of the path C from the focal point to the end part of the lens and the focal length f which is the distance of the path A from the focal point to the lens center.

As described above, the metalens 12 has a spherically curved shape, and the focal point is positioned at the center of the sphere. Accordingly, the distance from the focal point to the metalens 12 is the focal length f at any position.

Further, the distance c of the path C is a sum of the distance from the focal point to the end part of the spherical metalens 12, that is, the focal length f and the distance from the end part of the metalens 12 to a point p. As shown in FIG. 6, the point p is a point at which a distance to the lens end part (the end part of the lens) is the shortest distance in a plane which includes the center of the metalens 12 and which is perpendicular to the electromagnetic waves emitted from the light source 14 to the center of the metalens 12.

Accordingly, it is necessary for the metalens 12 to satisfy $(n_0\times f)+(\varphi_1\times\lambda\times\lambda/2\pi)=(n_0\times c)+(\varphi_{ii}\times\lambda/2\pi)$.

$$\text{Accordingly, } n_0\times(c-f)=(\varphi_1-\varphi_{ii})\times\lambda/2\pi \quad \text{Expression (3-a).}$$

In the above expression, $n_0$ is a refractive index of a space between the focal point and the metalens, $\varphi_1$ is a phase difference created by a lens at a lens center (path A), $\varphi_{ii}$ is a phase difference created by a lens at an end part of the lens (path C), f is a focal length, that is, a distance of the path A, c is a distance of the path C, and λ is a wavelength of electromagnetic waves to be targeted by the lens.

Figure 4:
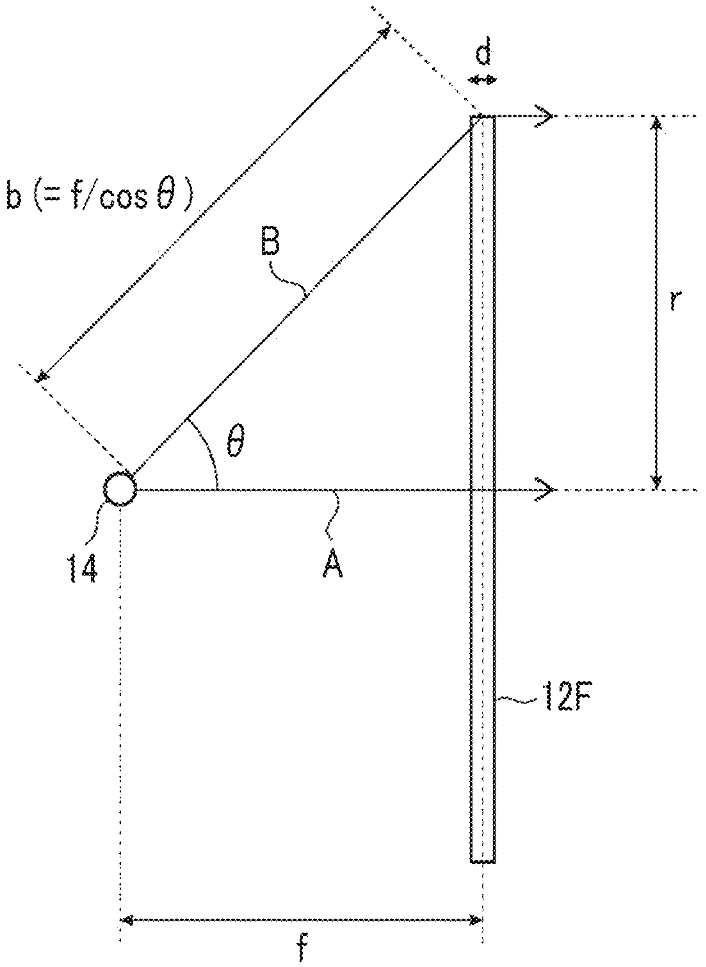
FIG. 4 is a conceptual diagram for describing an optical member in the related art.

It should be noted that r in the drawing is a radius of the flat-plate-shaped metalens 12F shown in FIG. 4.

Here, the space between the focal point and the lens is air. Accordingly, $n_0=1$.

Further, since the angle formed by the path A and the path C, that is, the prospective angle θ is "c=f+(f−f×cos θ)", Expression (3-b) is as follows.

$$1\times(2f-f\times\cos\theta-f)=(\varphi_1-\varphi_{ii})\times\lambda/2\pi \quad \text{Expression (3-b)}$$

The phase difference can be controlled by the lens is represented by $\Delta\varphi=\varphi_1-\varphi_{ii}=\pi$.

In such a case, Expression (3-b) is $f-f\times\cos\theta=\lambda/2$, and $$\cos\theta=1-\lambda/(2\times f) \quad \text{Expression (4).}$$

The prospective angle θ can be calculated in accordance with the focal length f and the wavelength λ of the electromagnetic waves to be targeted by using Expression (4).

Figure 7:
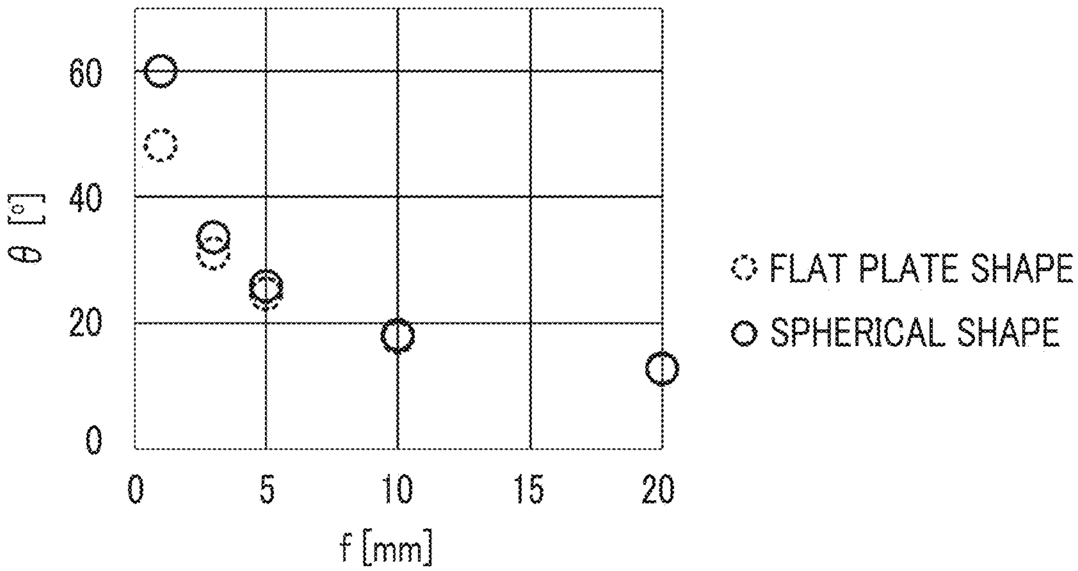
FIG. 7 is a graph showing an example of a relationship between a prospective angle and a focal length in the optical member according to the embodiment of the present invention.

FIG. 7 shows a relationship between the focal length f [mm] and the prospective angle θ [°] calculated from Expression (4).

It should be noted that the prospective angle is set under the following assumption in the example, as in the flat-plate-shaped metalens described above. It is assumed that a phase range, which the metalens is able to adjust, is 180°, and electromagnetic waves having a frequency of 300 GHz, that is, electromagnetic waves having a wavelength λ=1 mm is assumed.

Further, FIG. 7 also shows the relationship between the focal length f [mm] and the prospective angle θ [°] in the flat-plate-shaped metalens shown in FIG. 5 (broken line).

Figure 6:
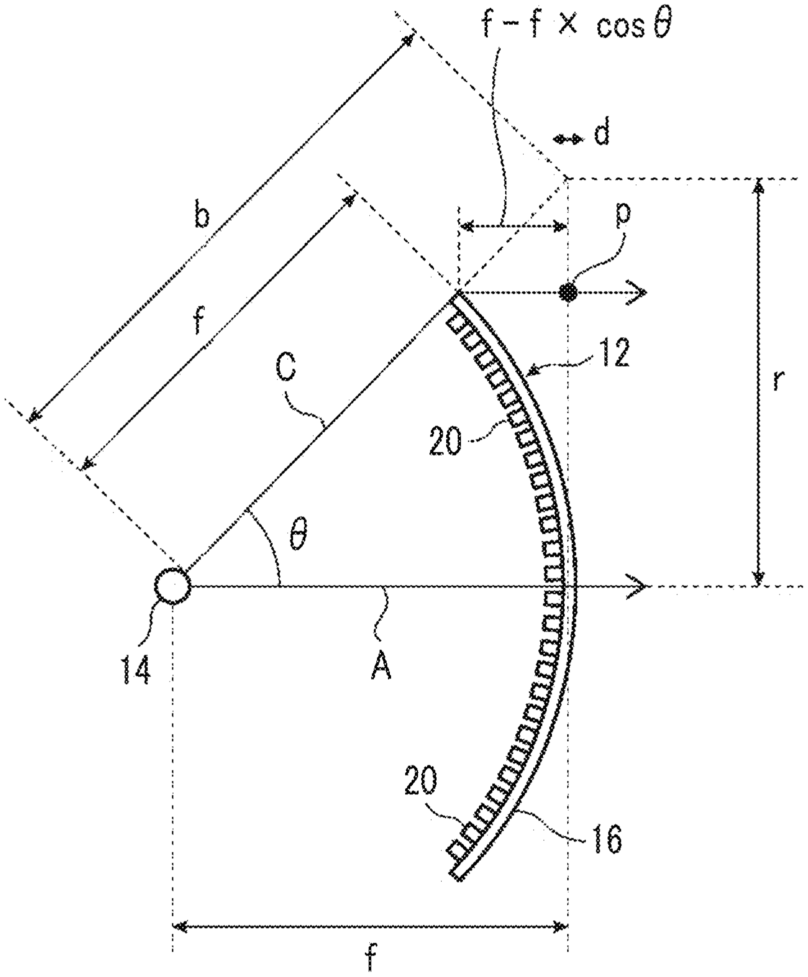
FIG. 6 is a conceptual diagram for describing the optical member according to the embodiment of the present invention.

As shown in FIG. 7, in particular, in a region in which the focal length is short, the spherical metalens 12 shown in FIG. 6 is able to increase the prospective angle θ more than the flat-plate-shaped metalens shown in FIG. 4, that is, the spherical metalens 12 is able to increase the numerical aperture of the lens.

As described above, it is necessary to provide a phase difference in the flat-plate-shaped metalens 12F by a distance difference (b−f) between the distance b of the path B from the focal point to the end part of the lens and the focal length f which is the distance of the path A from the focal point to the lens center.

On the other hand, even in the case of the spherical metalens 12, it is necessary to provide a phase difference in the metalens by a distance difference (c−f) between the distance c of the path C from the focal point to the end part of the lens and the focal length f which is the distance of the path A from the focal point to the lens center.

Here, as clearly shown from FIGS. 4 and 6, the distance c (path C) in the spherical metalens 12 is shorter than the distance b (path B) in the flat-plate-shaped metalens 12F. As a result, a distance difference between the path A and the path C in the spherical metalens 12 is smaller than a distance difference between the path A and the path B in the flat-plate-shaped metalens 12F.

As a result, there is a margin for the phase difference to be adjusted, and it is considered that the prospective angle θ can be increased by the margin. That is, by using the metalens 12 according to the embodiment of the present invention having a curved shape, it is possible to achieve both the reduction in size and the increase in prospective angle θ with respect to the flat-plate-shaped metalens.

The optical device 10 according to the embodiment of the present invention includes the metalens 12 (an optical member) according to the embodiment of the present invention and the light source 14 that emits electromagnetic waves having the wavelength corresponding to the metalens 12.

Here, in a case where it is assumed that the adjustable phase range of the metalens consisting of one layer of the metasurface structure is the maximum which is 180°, as described with reference to FIG. 4, in the flat-plate-shaped metalens 12F, the prospective angle θ, that is, an angle θ formed by a line connecting the center of the metalens 12F and the focal point and a line connecting the end part of the metalens 12F and the focal point can be represented by Expression (2).

$$\cos\theta = f/(f+\lambda/2) \qquad \text{Expression (2)}$$

As described above, it should be noted that f is the focal length of the metalens and λ is the wavelength of the electromagnetic waves to be targeted by the metalens.

On the other hand, by using the metalens 12 according to the embodiment of the present invention having a curved shape, the prospective angle θ can be increased as compared with the flat-plate-shaped metalens.

In consideration of this point, in the optical device 10 according to the embodiment of the present invention, assuming that a focal length of the metalens 12 (optical member) is f [mm] and a wavelength (the central wavelength (peak wavelength)) of the electromagnetic waves emitted from the light source 14 is λs [mm], it is preferable that an angle θs, which is formed by a line connecting the center of the metalens 12 to the light source and a line connecting the end part of the metalens 12 to the light source 14, satisfies the following expression.

$$\theta s > \arccos[f/(f+\lambda s/2)]$$

Accordingly, the prospective angle θ of the metalens 12 in the optical device 10, that is, the numerical aperture can be more suitably increased.

Although the above-mentioned metalens 12 has a spherically curved shape, the optical member according to the embodiment of the present invention is not limited thereto. Various curved shapes such as a paraboloid shape can be used as long as the electromagnetic waves can be concentrated.

Further, the curved shape of the optical member according to the embodiment of the present invention is not limited to a curved surface in a two-dimensional direction such as a spherical surface and a parabolic surface, and may be a curved shape having a curvature only in one direction such as a so-called cylindrical lens.

Accordingly, in the optical member according to the embodiment of the present invention, a projection shape from the optical axis direction is not limited to a circular shape. Various projection shapes such as a square shape, a rectangular shape, and an elliptical shape can be used.

Further, as a preferable aspect, the metalens 12 according to the example shown in the drawing has a curved shape in which a concave surface is provided on a side on which the electromagnetic waves are concentrated, that is, a focal point side in the example shown in the drawing. However, the present invention is not limited thereto, and a convex surface may be provided on a side on which the electromagnetic waves are concentrated.

Further, the optical member according to the embodiment of the present invention is not limited to a shape in which the entire surface is a co-directionally concave surface as a spherical shape.

Figure 8:
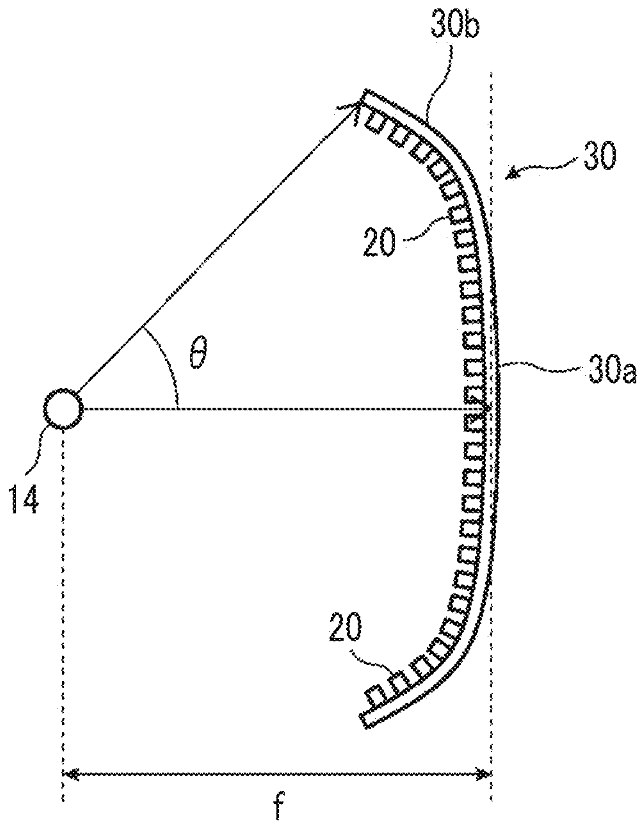
FIG. 8 is a conceptual diagram showing another example of the optical member according to the embodiment of the present invention.
Figure 9:
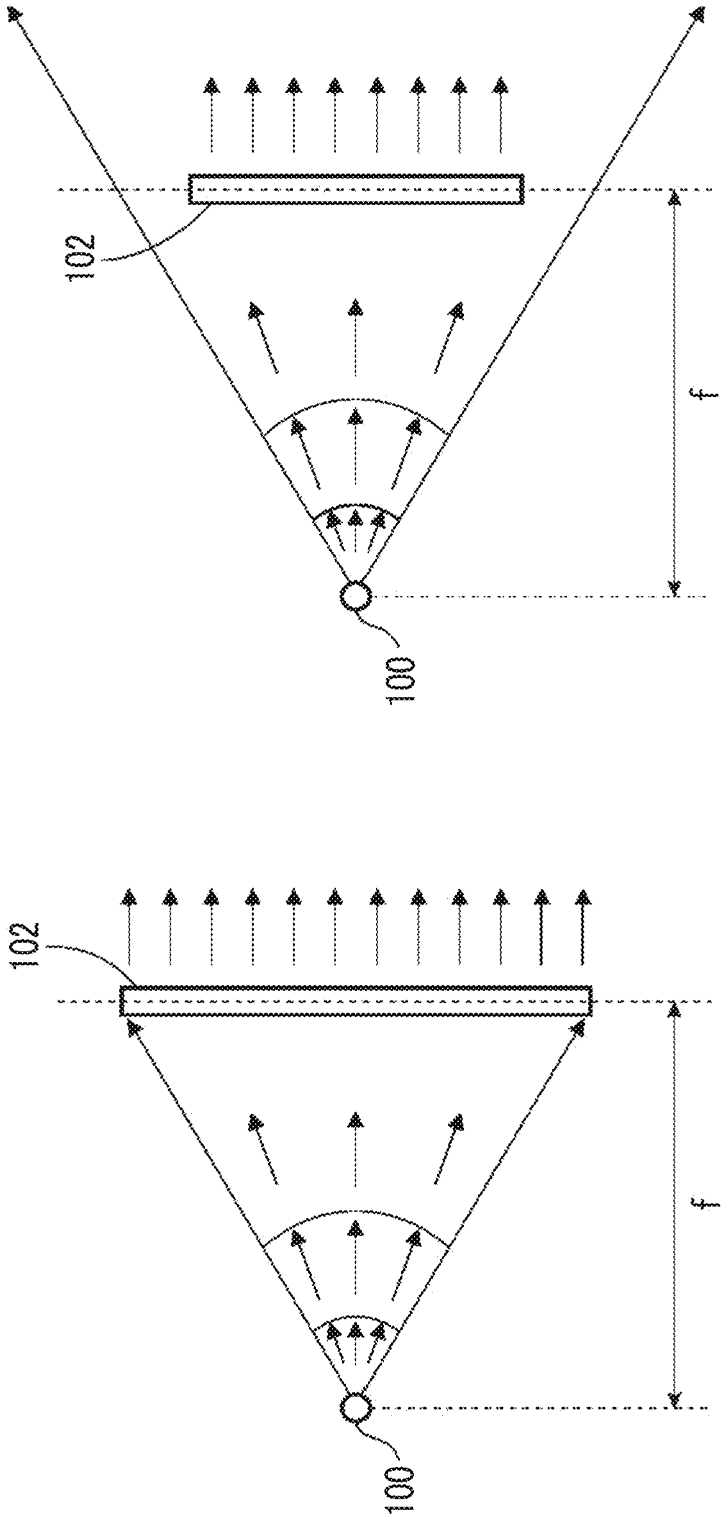
FIG. 9 is a diagram conceptually showing an example of the optical member in the related art.

For example, as in the metalens 30 shown in FIG. 8, the optical member according to the embodiment of the present invention may have a curved shape having a flat surface portion 30*a* and a curved surface portion 30*b* that is positioned outside the flat surface portion 30*a* and that is co-directionally concave.

Even in the case of the metalens 30 (optical member) having such a curved shape, due to the same actions and effects as those described above, the size (projection area) of the metalens 30 can be reduced as compared with the flat-plate-shaped metalens, and the prospective angle θ can be further increased.

Further, the optical member according to the embodiment of the present invention is not limited to the transmissive lens and may be a reflective lens.

Furthermore, the optical member according to the embodiment of the present invention may be a diffractive element.

Hereinabove, the optical member and the optical device according to the embodiment of the present invention have been described in detail. However, the present invention is not limited to the above-mentioned examples, and various improvements and modifications can be made without departing from the scope of the present invention.

EXAMPLES

Hereinafter, characteristics of the present invention will be described in further detail with reference to examples.

It should be noted that the following examples each show an example of the present invention. Accordingly, the scope of the present invention should not be construed as being limited by the specific examples given below.

Comparative Example 1

As a substrate, a cycloolefin polymer film having a thickness of 23 μm was provided.

The substrate was cut into a size of 5×5 cm, and the surface was cleaned with ultrasonic waves (45 kHz).

Thereafter, the cut substrate was placed inside a sputtering apparatus. After reducing a pressure inside the apparatus, argon gas (0.27 Pa) was introduced, and sputtering was performed on a target using copper. The sputtering was performed in order on one surface of a first substrate, and a copper layer having a thickness of 100 nm was formed on both surfaces of the first substrate.

Thereafter, the film was immersed in an acidic defatting agent (ATS PURE CLEAN N3, manufactured by OKUNO PHARMACEUTICAL INDUSTRIAL CO, LTD.) at a liquid temperature of 45 °C for 5 minutes, and an acid defatting treatment was performed thereon. Further, the film was immersed in 10% sulfuric acid at room temperature for 3 minutes, and an acid activation treatment was performed thereon.

Next, a photosensitive transfer member (negative type transfer material 1) described in JP2020-204757A was cut into a size of 5×5 cm, and a cover film was peeled off from the photosensitive transfer material.

The substrate and the photosensitive transfer member were cemented to each other such that a surface of a photosensitive resin layer exposed by the peeling of the cover film was in contact with the copper layer. It should be noted that the cementing was performed only to one surface of the copper layer.

Next, the obtained laminate was immersed in a copper plating liquid (TOPPLETINA SF, manufactured by OKUNO CHEMICAL INDUSTRIES CO., LTD.), and a copper plating treatment was performed under the condition of 1 A/dm$^2$.

The laminate after the copper plating treatment was washed with water and dried, and then immersed in a 1% by mass aqueous potassium hydroxide solution (pH=13.5) at 50 °C.

Subsequently, a temporary support of the photosensitive transfer member was peeled off, and then the photosensitive resin layer was peeled off using propylene glycol monomethyl ether acetate. Thereby, a substrate, in which the thickness of the copper layer on one side (the non-adhesive surface of the photosensitive transfer member) was increased to 500 nm, was obtained.

The same copper plating treatment was performed on the other surface of the substrate. Thereby, the substrate having copper layers having a thickness of 500 nm on both surfaces was obtained.

The photosensitive transfer member (negative type transfer material 1) described in JP2020-204757A was cut into a size of 4×4 cm, and the cover film was peeled off from the photosensitive transfer material. The substrate and the photosensitive transfer material were cemented to each other such that the surface of the photosensitive resin layer exposed by the peeling of the cover film was in contact with the copper layer.

The photosensitive transfer material was cemented to both surfaces of the substrate one by one, and a laminate was obtained. The cementing was performed under conditions of a roll temperature of 100 °C, a linear pressure of 1.0 MPa, and a linear velocity of 4.0 m/min.

Next, a photomask, in which a pattern complementary to the metal microstructure (metal cut wire) was formed, was laminated on each of both surfaces of the obtained laminate on the temporary support side of the photosensitive transfer material.

Thereafter, the photosensitive resin layer of the photosensitive transfer material was exposed through the photomask by irradiation with an ultra-high pressure mercury lamp (MAP-1200L, manufactured by Daiken Kagaku Kogyo Co., Ltd., exposure main wavelength: 365 nm) at 100 mJ/cm$^2$.

It should be noted that the pattern of the photo mask was designed to correspond to a pattern of the metal microstructure of the metalens produced in "Applied Physics Express 14, 082001 (2001)".

The temporary supports of the photosensitive transfer material on both surfaces were peeled off from the exposed laminate.

Then, the laminate was subjected to shower development for 30 seconds using a 1.0% sodium carbonate aqueous solution having a liquid temperature of 25 °C, and a resist pattern was formed on each of both surfaces of the copper layer.

Next, the copper layer of the obtained laminate was etched at 23 °C for 30 seconds using a copper etchant (Cu-02, manufactured by Kanto Chemical Co., Inc.). Further, the resist pattern was peeled off using propylene glycol monomethyl ether acetate.

As described above, the metalens pattern described in "Applied Physics Express 14, 082001 (2001)" was formed on one surface of the substrate.

Further, by the same method, a similar pattern was formed on the other surface of the substrate, and a planar metalens A having a focal length of 1.0 mm and a lens diameter of 2.0 mm for a frequency of 0.312 THz was produced.

Example 1

A metalens B having a spherically curved shape was produced as follows.

A metalens pattern was formed using the same method as that of Comparative Example 1, except that the photomask pattern was changed.

A photo mask pattern was assumed to be a metalens having a spherically curved shape. A phase difference φ(θx) at each in-plane position formed by each metal microstructure was adjusted to satisfy the following expression.

$$\varphi(\theta x) = \varphi 0 - 2\pi/\lambda \times [f \times (1 - \cos\theta x)]$$

Figure 10:
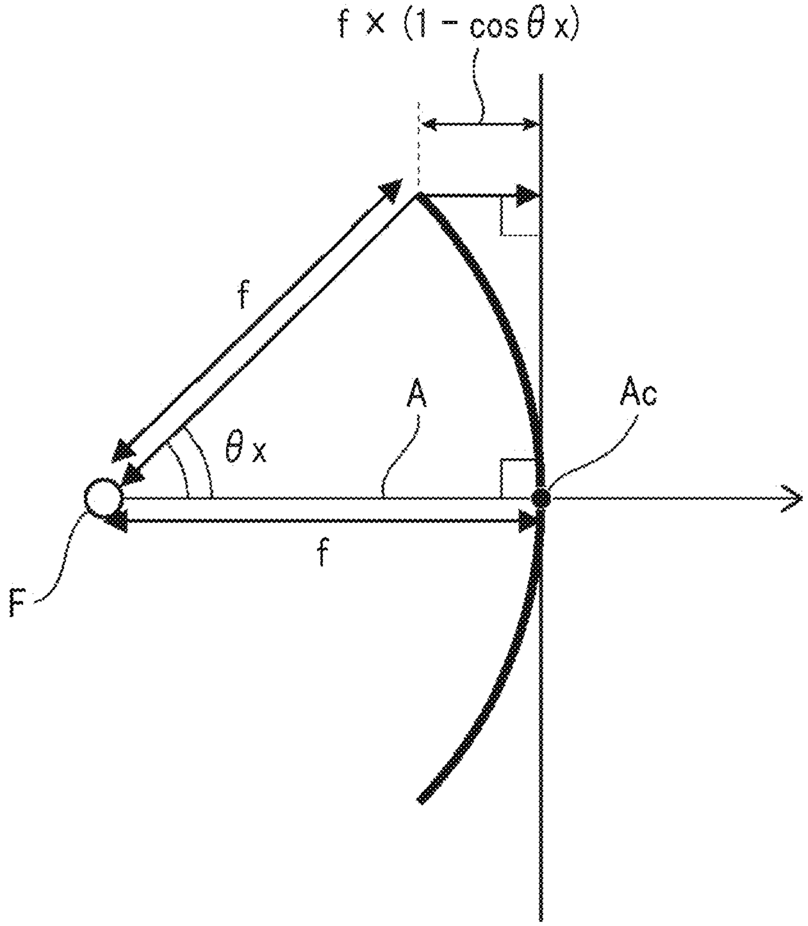
FIG. 10 is a conceptual diagram for describing an example of the present invention.

It should be noted that in the expression, θx is an angle formed by a line connecting the focal position F and the lens center Ac and a line connecting the focal position F and a position in the lens where the phase difference φ(θx) is formed, φ0 is a phase difference formed at the lens center Ac, λ is a wavelength of the incident electromagnetic waves, that is, 961 μm (corresponding to a frequency of 0.312 THz), and f is a designed focal length, that is, 1.0 mm (refer to FIG. 10 above).

The phase difference formed by the metal microstructure was adjusted by a length of the metal microstructure.

Further, the width and the interval of the metal microstructure were adjusted such that the metalens had a spherically curved shape with the focal length of 1.0 mm at the prospective angle of 45° which is the angle formed by the line connecting the focal position F and the lens center Ac and the line connecting the focal position F and the lens end part. In addition, the photomask pattern was adjusted such that the metalens had a spherically curved shape having a diameter of 1.6 mm (=2π×1.0 mm×90°/360°).

A substrate, on which the metalens pattern having a diameter of 1.6 mm was formed, was pressed against a metal sphere having a diameter of 2.0 mm, and the substrate was heated at 180 °C for 1 minute to form a spherically curved shape.

Thereby, the metalens B having the spherically curved shape with a focal length of 1.0 mm and a lens diameter of 1.57 mm for a frequency of 0.312 THz was produced.

[Evaluation]

By the following method, the intensity of the radio waves collimated by the produced metalens A and the metalens B was measured.

An optical system was formed by connecting a terahertz generation module (TAS1120, manufactured by Advantest Corporation) and a terahertz detection module (TAS1230, manufactured by Advantest Corporation) to a laser output port of a terahertz light sampling analysis system (TAS7400TS, manufactured by Advantest Corporation).

Radio waves (a wavelength of 961 μm), which were output from the terahertz generation module and passed through an aperture, were used in a simulated point light source, and the metalens was disposed at a position 1.0 mm away from the point light source.

Further, the polarization direction of the radio waves was adjusted to be parallel to the longitudinal direction of the fine metal structure of the metalens.

A terahertz detection module was disposed behind the metalens on a line connecting the point light source and the metalens, and an intensity of the transmitted radio waves was measured.

The intensity in the metalens A was set to 1.0, and the following evaluation was performed.

A: intensity of 1.0 to 0.9

B: intensity of 0.9 to 0.5

C: intensity of 0.5 to 0

The results are summarized in the following table.

TABLE 1

| | Metalens | Focal length | Lens diameter | Collimated radio wave intensity |
|---|---|---|---|---|
| Example 1 | B (curved surface) | 1.0 mm | 1.57 mm | A |
| Comparative Example 1 | A (flat surface) | 1.0 mm | 2.00 mm | A |

As shown in the above-mentioned table, it was found that, by using the curved metalens according to the embodiment of the present invention, the lens size can be reduced while the radio waves generated from the point light source are collimated and the same transmission intensity as that of the planar metalens is formed.

From the above results, the effect of the present invention is clear.

The present invention can be suitably used for controlling communication in a next-generation communication standard and the like.

EXPLANATION OF REFERENCES

10: optical device
12, 12F, 30, 102: metalens
14, 1002: light source
16: substrate
20: microstructure (resonator)
30*a*: flat surface portion
30*b*: curved surface portion

What is claimed is:

1. An optical device comprising:
an optical member; and
a light source,
wherein the optical member comprises a substrate and a metasurface structure that has a plurality of microstructures arranged to be provided on at least one surface of the substrate,
wherein at least a part of the optical member has a curved shape, and
assuming that the optical member has a light concentration function, a focal length of the optical member is f [mm], and a wavelength of electromagnetic waves emitted from the light source is λs [mm], and
an angle θs, which is formed by a line connecting a center of the optical member to the light source and a line connecting an end part of the optical member to the light source, satisfies a following relationship, $$\theta s > \arccos[f/(f+\lambda s/2)].$$

2. The optical device according to claim 1,
wherein the optical member has a function of concentrating electromagnetic waves in a case where the electromagnetic waves are incident from one surface of the substrate, and the curved shape has a concave surface on a light concentration side.

3. The optical device according to claim 2,
wherein the optical member is a transmissive lens or a reflective lens.

4. The optical device according to claim 2,
wherein the optical member is a diffractive element.

5. The optical device according to claim 2,
wherein a wavelength targeted by the metasurface structure is 10 μm to 1 cm.

6. The optical device according to claim 2,
wherein the entire surface of the optical member is a co-directionally concave surface.

7. The optical device according to claim 2,
the optical member further comprising:
a flat surface portion; and
a curved surface portion that is positioned outside the flat surface portion and that is co-directionally concave.

8. The optical device according to claim 1,
wherein the optical member is a transmissive lens or a reflective lens.

9. The optical device according to claim 8,
wherein a wavelength targeted by the metasurface structure is 10 μm to 1 cm.

10. The optical device according to claim 8,
wherein the entire surface of the optical member is a co-directionally concave surface.

11. The optical device according to claim 8,
the optical member further comprising:
a flat surface portion; and
a curved surface portion that is positioned outside the flat surface portion and that is co-directionally concave.

12. The optical device according to claim 1,
wherein the optical member is a diffractive element.

13. The optical device according to claim 1,
wherein a wavelength targeted by the metasurface structure is 10 μm to 1 cm.

14. The optical device according to claim 1,
wherein the entire surface of the optical member is a co-directionally concave surface.

15. The optical device according to claim 1,
the optical member further comprising:
a flat surface portion; and
a curved surface portion that is positioned outside the flat surface portion and that is co-directionally concave.

16. The optical device according to claim 1,
wherein the substrate is a sheet-like substrate having a uniform thickness.

17. The optical device according to claim 1,
wherein the curved shape of the optical member is a part of a spherical shape, and the optical member has a focal point at a center of the sphere.

18. The optical device according to claim 17,
wherein the light source is disposed at a focal position of the optical member.

19. The optical device according to claim 1,
wherein the light source is disposed at a focal position of the optical member.

* * * * *